INVENTOR
A.C.BEADLE
BY
Robert Harding Jr.
ATTORNEY

Nov. 13, 1956 A. C. BEADLE 2,770,679

TELEPHONE SUBSETS

Filed April 14, 1952 3 Sheets-Sheet 2

INVENTOR
A. C. BEADLE
BY
Robert Harding Jr.
ATTORNEY

Nov. 13, 1956 A. C. BEADLE 2,770,679

TELEPHONE SUBSETS

Filed April 14, 1952 3 Sheets-Sheet 3

Inventor
A.C.BEADLE

By Robert Harding Jr.
Attorney.

United States Patent Office 2,770,679
Patented Nov. 13, 1956

2,770,679

TELEPHONE SUBSETS

Anthony Crisp Beadle, London, England, assignor to International Standard Electric Corporation, New York, N. Y., a corporation of Delaware

Application April 14, 1952, Serial No. 282,131

Claims priority, application Great Britain April 26, 1951

6 Claims. (Cl. 179—81)

This invention relates to telephone substation circuits.

According to the invention there is provided a telephone substation circuit comprising a transmitter and a receiver and non-linear resistance means connected in the circuit so that the said non-linear resistance means is traversed by at least part of the unidirectional line current and so that the resistance of the said non-linear resistance means is varied under control of the said unidirectional line current and so that the said non-linear resistance means provides a variable shunt across the receiver which shunt falls in impedance when the said unidirectional line current increases and rises in impedance when the said unidirectional line current diminishes.

According to the invention there is further provided a telephone substation circuit having a transmitter, a receiver and variable shunt means for the receiver comprising a non-linear resistance element traversed by at least part of the unidirectional energising current applied to the transmitter and means under control of the said unidirectional current for reducing the resistance of the said element when the said current rises and for increasing the resistance of the said element when the said current falls.

According to the invention there is further provided a telephone substation circuit comprising a pair of line terminals, a transmitter, a receiver, a line balancing network, an induction coil having a first winding, a second winding and a third winding, a condenser and a bridge network of two non-linear resistance elements connected in series with one another and together in parallel with two linear resistance elements connected in series with one another the circuit being connected up so that there is a conducting path from one line terminal to the other, through the first winding of the said coil, the transmitter and the said bridge network, the said path through the bridge network branching into two parallel paths one through the two non-linear resistances in series with one another and the other through the two linear resistances in series with one another, that the condenser, the line balancing network and the second winding of the said coil, in series with one another in any order are connected between the terminal of the transmitter other than the one connected to the said bridge network, and the junction of the two linear resistances of the bridge network, that the receiver and the third winding of the said coil in series with one another are connected in parallel with the line balancing network, that the junction of the two non-linear resistances is connected to the terminal of the receiver other than the one connected to the junction of the two linear resistance elements, that the said bridge network is arranged to present a shunt to the receiver which diminishes in resistance when the unidirectional line current increases and which rises in resistance when the unidirectional line current falls, and that the bridge network also is arranged so that the points thereof to which the receiver is connected are substantially equipotential points in respect of currents applied to or generated by the transmitter.

The invention will be more readily understood from the following description of certain embodiments of the invention illustrated in the accompanying drawings in which.

With transmitters and receivers as hitherto used in telephone subsets connected to a common battery system it has been possible to obtain satisfactory performance with a subset circuit containing fixed impedance elements.

The introduction of more efficient transmitters and receivers enables more satisfactory results to be obtained on long lines but on short lines introduces difficulties such as excessive receiving levels and objectionable side-tone leading in extreme cases to howling.

It is proposed to regulate the receiving efficiency of the instrument by means of a variable impedance controlled by the line current.

The direct current flowing in a telephone line connected to a common battery exchange and a subscriber's set is controlled by three main factors.

(1) Feed circuit (viz. battery voltage and feed resistance).

(2) Line resistance.

(3) Subscriber's set resistance which includes the induction coil resistance (usually very small, say 20 ohms) and the transmitter resistance.

Variations of line resistance result in line current variations which may be from approximately 100 ma. on zero line to 40 ma. on a limiting loop, or even greater. There is therefore at least a 2.5:1 variation of line current from zero to limiting loops, and this variation is used in the embodiments described, to change the receiving efficiency of the subset.

Figure 1:
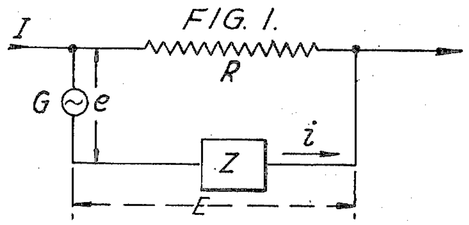
Fig. 1 is a diagram illustrating the basic idea used in the embodiments.

Fig. 1 shows a part of a subset traversed by the D. C. line current. A resistance R is shunted by a non-linear element Z whose resistance falls as the current through it is increased.

The resistance of Z varies according to the law current $i=kE^n$, where $n$ is a factor representing the current/resistance characteristic of Z. A generator G of E. M. F. "$e$," having negligible source impedance, is in series with the non-linear element and represents the receiver circuit of the subset.

If the resistance of Z is large in relation to that of R the D. C. voltage E, across R and Z, $\simeq$RI. Therefore, since $$i=kE^n$$

$$i\simeq kR^nI^n$$

Impedance of $$Z\simeq\frac{E}{i}\simeq\frac{RI}{i}\simeq\frac{RI}{kR^nI^n}$$

$$\simeq k^{-1}R^{1-n}I^{1-n}$$

thus, as the line varies from limiting to zero loop the impedance of Z will fall in the ratio $1:2.5.^{(1-n)}$.

The value of $n$ will vary with the type of non-linear element employed from approximately 4 for silicon carbide varistors to 6 or more for rectifiers with a working point near the "knee" of the voltage current characteristic curve. With directly heated thermistors with suitable ballast resistance an even higher index may be obtained.

It will thus be seen that the impedance of Z may readily be changed by a ratio of 15:1 or more and since R is small the load impedance into which the generator G looks, will vary by the same amount. If the circuit is so arranged that Z is effectively in shunt with the receiver, a useful loss of receiver efficiency may be obtained on short lines whilst producing negligible loss on long lines.

In applying this basic idea to a telephone subset three factors must be taken into consideration.

(1) The receiver should be isolated from D. C.

(2) The application should not impair transmitting or receiving efficiency on long lines.

(3) On long lines, additional E. M. F. should not be fed to the receiver, to the detriment of anti-side-tone balance.

Figure 2:
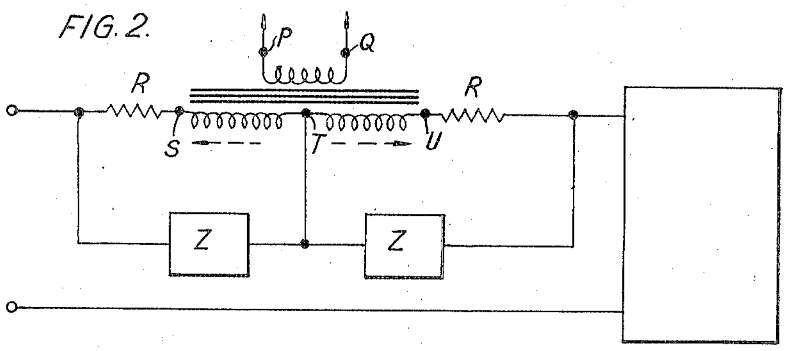
Figs. 2, 3 and 4 are diagrams illustrating various methods of applying the basic idea to a telephone subset circuit.
Figure 3:
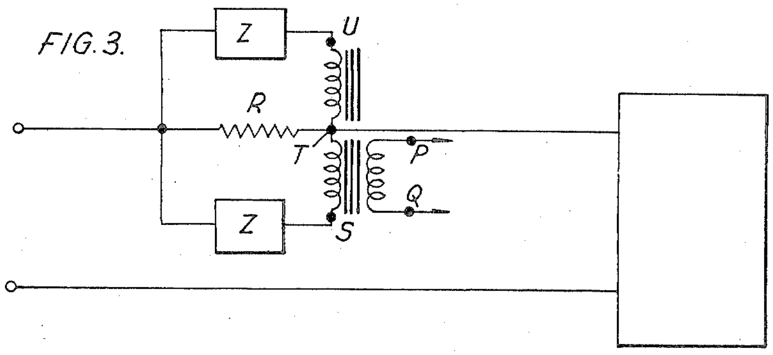
Figure 4:
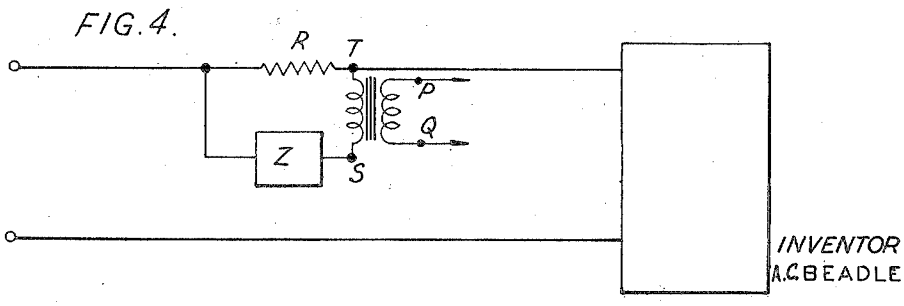

These considerations have been embodied in the circuits shown in Figs. 2, 3 and 4.

The circuit of Fig. 2 employs a transformer with a centre tapped astatically wound primary winding S. T. U. The line current passing through these windings produces magnetising forces which balance one another and therefore do not saturate the transformer core. The circuit of Fig. 1 has been duplicated to provide a balanced circuit with half of the primary winding S. T. U. in each branch, taking the place of G in Fig. 1. The secondary winding P. Q. shunts the receiver. The primary A. C. current can not introduce E. M. F.'s into the secondary, and secondary E. M. F.'s can produce no resultant E. M. F. across the primary though equal and opposite circulating currents flow in each half. The resistances R, which in practical circuits may be the resistance of the transformer winding, are adjusted so that the non-linear elements Z conduct sufficiently on short lines to produce the necessary shunting loss on the receiver.

The two Z's in parallel become effectively a shunt across the receiver through the operation of the transformer.

Fig. 3 shows an alternative arrangement of the circuit employing the same type of transformer. It has the advantage over the previous circuit that the resistance R is independent of the transformer resistance and may readily be adjusted and the transformer resistance is no longer critical though it must be fairly low. Moreover since the transformer no longer carries the main A. C. line current, the transformer design may be simplified and A. C. transmission losses on long lines are limited to the negligible loss due to the resistance R.

In this circuit, if R is small, the A. C. voltage drop across it is negligible and it is found in practice that it is unnecessary to have the balanced arrangement. The unbalanced arrangement of Fig. 4 introduces no significant change in side-tone balance due to the E. M. F. directly fed from the primary winding S. T., to the receiver via the transformer secondary winding P. Q.

The above circuits of Figs. 2, 3 and 4 may be applied to most of the well known basic subset circuits since the receiver shunt winding is isolated from the primary control winding. The primary control winding will normally be placed in the high impedance line circuit and in many circuits the secondary winding will have a common point with the primary.

Figure 5:
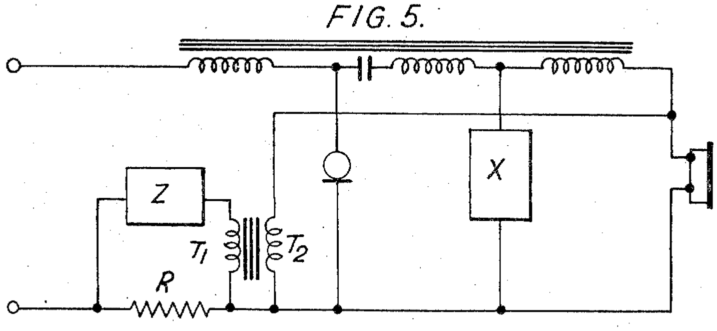
Figs. 5 and 6 are diagrams showing actual circuits based on the methods of Figs. 2, 3 and 4.
Figure 6:
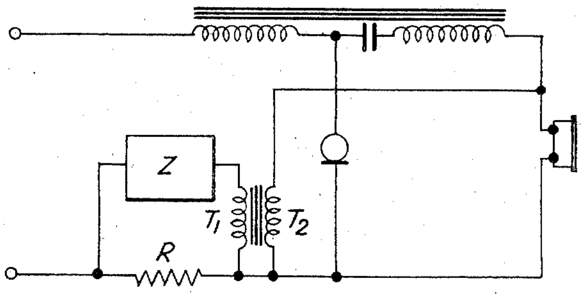

Fig. 5 shows the circuit of Fig. 4 employed in a well known anti-side-tone circuit and Fig. 6 shows its employment in a side-tone circuit. In these circuits ringer and switch contacts are not shown.

Figure 7:
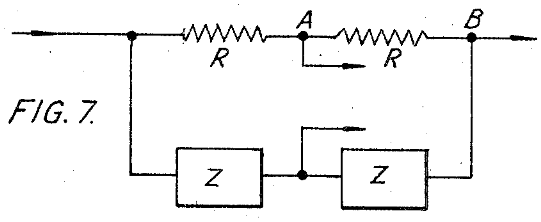
Fig. 7 is a diagram showing another method of applying the said basic idea to a telephone subset.

Fig. 7 shows an alternative arrangement obviating the need for the transformer. It may be applied to subset circuits in which transmitter and receiver normally have a common point of contact. As far as D. C. is concerned the receiver is arranged in a bridge circuit which is balanced for all values of line current by means of the matched varistors Z. Small out-of-balance A. C. E. M. F.'s may be fed to the receiver since the receiver must be connected to the point A and the transmitter to the point B. In practice these out-of-balance E. M. F.'s are so small that they can be disregarded.

Figure 8:
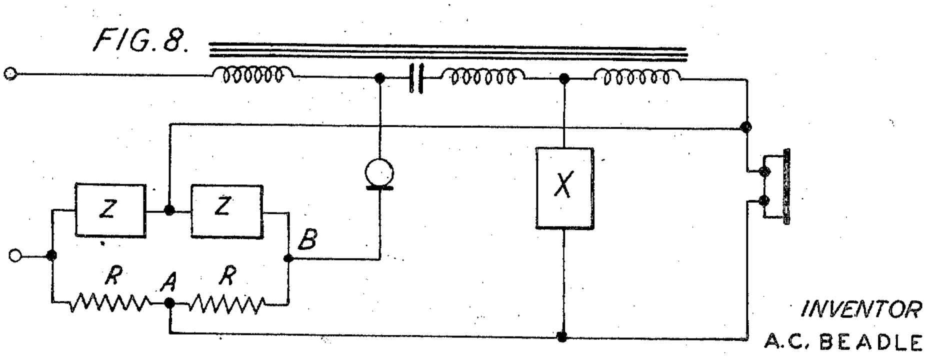
Figs. 8 and 9 are diagrams showing actual circuits based on the method of Fig. 7.
Figure 9:
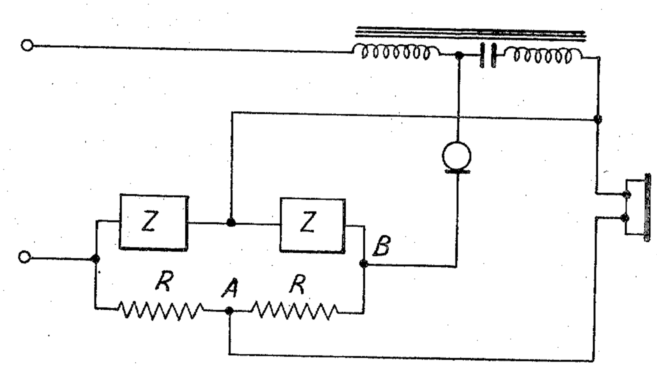

Figs. 8 and 9 illustrate respectively typical anti-side-tone and side-tone subset circuits employing this arrangement.

The non-linear element may be any varistor the resistance of which decreases with increasing current e. g., thermistors, silicon carbide type elements, or rectifiers. When the latter are employed two must be placed in parallel and oppositely poled to ensure operation whatever the direction of the line current.

The controlling resistance R may be kept very small. If selenium rectifiers are employed for the non-linear elements, R may have the value of about 5 ohms and, with copper oxide rectifiers for the non-linear elements, even less.

The non-linear elements need carry only a very small proportion of the line current, and hence may be small components with a low power rating. Since, they are permanently shunted by a low resistance the risk of failure, in particular by line surges, is small.

If the non-linear element is instantaneously acting (e. g. rectifiers or silicon carbide type discs) they may, by suitable choice of values, be arranged to suppress clicks in the receiver caused by switching, etc. They may indeed be no larger than varistors sometimes placed across the receiver solely for click suppression.

A fixed resistance may be inserted in series in the receiver shunt path to limit the minimum value of resistance to which the shunt may fall. In Figs. 5 and 6, this resistance should preferably be inserted in the connection between T2 and the upper side of the receiver and in Figs. 8 and 9, the resistance should preferably be inserted in the connection between the two non-linear resistance elements Z—Z and the upper side of the receiver.

The circuits of Figs. 5 and 8 are frequently modified by placing one or more of the windings of the induction coil in the lower path of the circuit for convenience of wiring. This is frequently done so that the transmitter and the receiver may have a common terminal enabling a three-wire handset cord to be used. The circuits when modified in this way work in the same manner and the consequent rearrangement of the connections when a circuit incorporating this invention is so modified will be obvious to those skilled in the art.

There are many well known variants of the anti-side-tone circuit used as a basis in Figs. 5 and 8 the commonest of which is the variant where the positions of the receiver and the X network are transposed in the circuit and when the invention is applied to such a circuit the connection from the receiver to the shunt circuit (the upper connection in Figs. 5 and 8) is transposed with the receiver. This variant may also be modified as described in the last preceding paragraph.

While the principles of the invention have been described above in connection with specific embodiments, and particular modifications thereof, it is to be clearly understood that this description is made only by way of example and not as a limitation on the scope of the invention.

What I claim is:

1. A telephone substation circuit comprising a pair of line terminals, a transmitter, a receiver, a line balancing network, an induction coil having a first winding, a second winding and a third winding, a condenser and a bridge network of two non-linear resistance elements connected in series with one another and together in parallel with two linear resistance elements connected in series with one another the circuit being connected up so that there is a conducting path from one line terminal to the other, through the first winding of the said coil, the transmitter and the said bridge network, the said path through the bridge network branching into two parallel paths one through the two non-linear resistances in series with one another and the other through the two linear resistances in series with one another, that the condenser, the line balancing network and the second winding of the said coil, in series with one another in any order are connected between the terminal of the transmitter other than the one connected to the said bridge network, and the junction of the two linear resistances of the bridge network, that the receiver and the third winding of the said coil in series with one another are connected in parallel with the line balancing network, that the junction of the two non-linear resistances is connected to the terminal of the receiver other than the one connected to the junction of the two linear resistance elements, that the said bridge network is arranged to present a shunt to the receiver which diminishes in resistance when the unidirectional line current increases and which rises in resistance when the unidirectional line current falls, and that the bridge network also is arranged so that the points thereof to which the receiver is connected are substantially equipotential points in respect of currents applied to or generated by the transmitter.

2. A telephone circuit comprising a line, a receiver, a transmitter, a direct-current transmitter energizing source connected to said line, impedance means coupling said source to said transmitter, a non-linear resistance coupled to said impedance means and in shunt with said receiver and traversed by a portion of the uni-directional transmitter energizing current received over said line, said resistance having a characteristic whereby the impedance thereof varies inversely with the amplitude of the transmitter energizing current energy applied thereto, and means decoupling said receiver from said direct current path.

3. The circuit according to claim 2 wherein said non-linear resistance comprises a current sensitive impedance.

4. The circuit according to claim 2 wherein said non-linear resistance comprises a varistor.

5. The circuit according to claim 2 wherein said decoupling means comprises a transformer, the primary of which is connected in the path between said source and said transmitter and the secondary of which is connected to said receiver.

6. The circuit according to claim 2 wherein said decoupling means comprises a bridge circuit having two resistive arms and two variable impedance arms, the receiver having one terminal coupled to the junction of said resistive arms and a second terminal coupled to the junction of said variable impedance arms, the bridge being balanced for all values of direct current energy whereby the direct current energy by-passes said receiver.

References Cited in the file of this patent

UNITED STATES PATENTS

| | | |
|---|---|---|
| 2,287,998 | Johnson | June 30, 1942 |
| 2,288,049 | Tillman | June 30, 1942 |
| 2,387,269 | Johnson | Oct. 23, 1945 |
| 2,604,543 | Goodale | July 22, 1952 |
| 2,620,402 | Bostford | Dec. 2, 1952 |
| 2,629,783 | Hopkins | Feb. 24, 1953 |